United States Patent
Hofmann (10) Patent No.: US 8,051,428 B2
(45) Date of Patent: Nov. 1, 2011

(54) DEFINITION OF AN INTEGRATED NOTION OF A MESSAGE SCENARIO FOR SEVERAL MESSAGING COMPONENTS

(75) Inventor: Christoph Hofmann, Wiesloch (DE)

(73) Assignee: SAP AG, Walldorf (DE)

( * ) Notice: Subject to any disclaimer, the term of this patent is extended or adjusted under 35 U.S.C. 154(b) by 902 days.

(21) Appl. No.: 12/048,173

(22) Filed: Mar. 13, 2008

(65) Prior Publication Data
US 2009/0235276 A1    Sep. 17, 2009

(51) Int. Cl.
*G06F 13/00* (2006.01)
(52) U.S. Cl. ......................................... 719/313; 709/230
(58) Field of Classification Search .................. 719/313; 709/230
See application file for complete search history.

(56) References Cited

U.S. PATENT DOCUMENTS

| | | | |
|---|---|---|---|
| 2004/0128355 A1 | 7/2004 | Chao et al. | |
| 2004/0205136 A1* | 10/2004 | Whittenberger et al. | 709/206 |
| 2006/0123425 A1 | 6/2006 | Ramarao et al. | |
| 2006/0267802 A1 | 11/2006 | Judge et al. | |
| 2007/0180132 A1* | 8/2007 | Purdy et al. | 709/230 |
| 2007/0198467 A1* | 8/2007 | Wiser et al. | 707/1 |
| 2007/0198989 A1* | 8/2007 | Vernal et al. | 719/313 |

OTHER PUBLICATIONS

EPO Form 1507N, Communication enclosing the Extended European Search Report dated Jun. 18, 2009 for corresponding EP Application 09003700.3.2211.
Acharya et al., "A programmable message classification engine for session initiation protocol (SIP)", Proceedings of the 3$^{rd}$ ACM/IEEE Symposium on Architecture for Networking and Communications Systems, [online] 2007, pp. 185-194. Retrieved from the Internet: [retrieved on May 25, 2009].

* cited by examiner

*Primary Examiner* — Andy Ho
(74) *Attorney, Agent, or Firm* — Mintz, Levin, Cohn, Ferris, Glovsky & Popeo, P.C.

(57) ABSTRACT

A computer-implemented method, computer program product, and system for monitoring messages being exchanged at runtime between two or more applications via a message exchange infrastructure are presented. A scenario definition for one or more messages is provided, the scenario definition including a number of scenario conditions that are associated with a set of scenario attributes related to the message header and/or message payload. A message format of the one or more messages is enriched at runtime with an associated set of scenario attributes.

20 Claims, 9 Drawing Sheets

DEFINITION OF AN INTEGRATED NOTION OF A MESSAGE SCENARIO FOR SEVERAL MESSAGING COMPONENTS

BACKGROUND

This disclosure relates generally to message exchange systems, and more particularly to message exchange scenario definition techniques and systems.

Message exchange systems, such as SAP AG's exchange infrastructure (XI), are used to integrate external systems using proprietary, legacy or standard messaging formats. In SAP's XI, for example, senders and receivers are separated from one another, and exchange messages using an Integration Server. This separation makes it easier to connect systems that are technologically different. Every system that can exchange messages with the Integration Server can also exchange messages with all other systems that are connected to the Integration Server.

SAP's XI supports direct communication using proxies, which are generated in the application systems using a description in WSDL (Web Service Description Language). XI also supports communication using adapters. In this case, interfaces for message exchange are created in the application system, or existing interfaces are used. Simple message processing on the Integration Server is stateless, e.g., the Integration Server does not know of any connections between various messages.

Cross-component integration processes, on the other hand, describe related processes, which can use the knowledge about messages that have already been processed to further control the process (for example, waiting for the corresponding response for a message in order to start further actions). SAP's XI enables enterprises to model, change, and manage these cross-component integration processes centrally. These processes are executed on the Integration Server and are included in message processing by configuration.

After starting with pilot projects for introducing a message exchange system in their enterprises, customers increasingly use those systems for bigger and more business-critical scenarios with a large message load. However, message exchange systems such as XI are very complex tools which only provide a limited means for controlling and monitoring. Thus, it is getting more and more difficult to detect errors and erroneous situations and to prove that the message exchange system is in a healthy state.

Today's XI or similar system only offers a possibility to monitor messages by explicitly giving selection criteria in the monitors of the different messaging components (integration server and adapter engine). It does not have a notion of a cross-component message scenario where a subset of all the message traffic can be defined according to certain message execution attributes. Such a notion is necessary for effective use of XI under high message load so that only certain relevant subsets of the messages can be monitored by dedicated users responsible for these message subsets (e.g. messages with high priority). No scenario notion is currently available in XI monitoring tools, and therefore relevant messages can only be selected explicitly in the different message monitors by providing all selection attributes.

SUMMARY

In general, this document discusses a system and method for providing a mechanism for scenario definition of messages exchanged by a message exchange infrastructure. The system and method include mechanisms to enrich a message format at runtime with necessary scenario attributes, provide selections according to the scenario attributes, and integrate the scenario attributes into an aggregation infrastructure. The system and method enable defining messaging scenarios according to message priority, business area, technical message components, or any other purposes, and provide aggregated views on these scenarios.

In one aspect, a computer-implemented method for monitoring messages being exchanged at runtime between two or more applications via a message exchange infrastructure is presented. The method includes providing a scenario definition for one or more messages, the scenario definition including a number of scenario conditions that are associated with a set of scenario attributes related to the message header and/or message payload. The method further includes enriching a message format of the one or more messages at runtime with an associated set of scenario attributes.

In another aspect, a system and computer program product are presented which execute a method substantially as described. This document describes approaches for implementing the message selection and discusses how the requirements are fulfilled. The scenarios are distinguished by their internal representation, and include direct representation, agreement representation, and hash representation.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for defining scenarios for messages exchanged by a message exchange infrastructure, for improved message monitoring and aggregated views on message execution.

Figure 1:
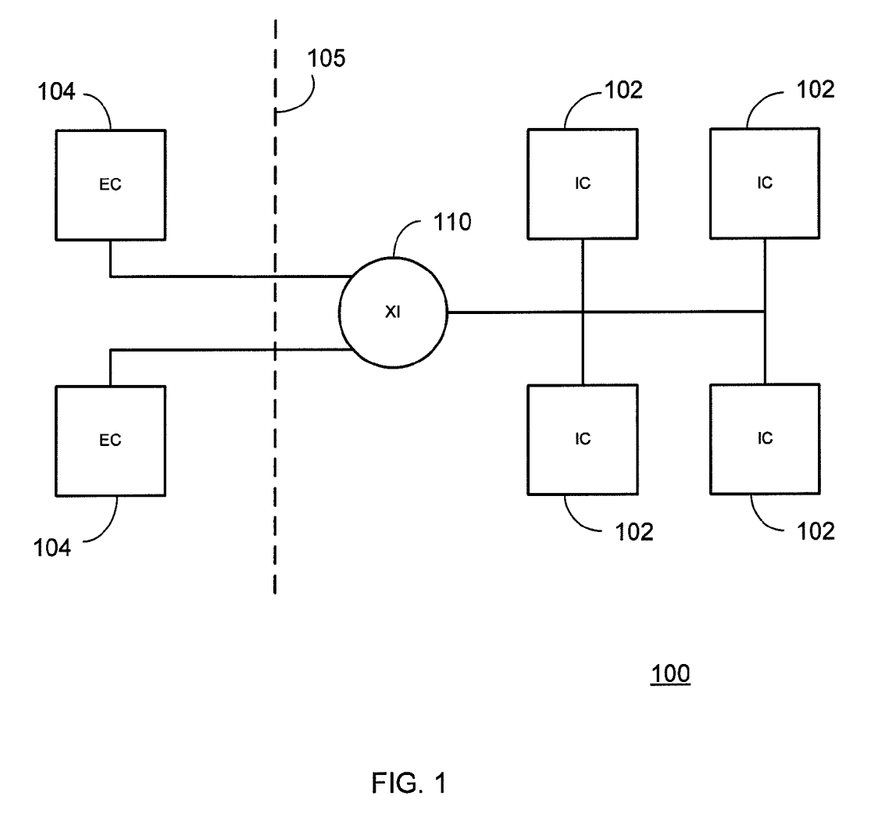
FIG. 1 is a simplified block diagram of a system for message-based integration.

FIG. 1 is a simplified block diagram of a system 100 for message-based integration. The system 100 include an XI 110 for collaborative processing among internal components (ICs) 102 of an enterprise, and between external components (ECs) 104 that communicate to one or more ICs 102 through a firewall 105. The ICs and ECs 102 and 104 represent any of a number of processes or services and their software and hardware, such as Web portals, buying or selling programs, electronic mail, business management programs, project planning programs, etc., and are preferably Web-based applications. Each of the ICs/ECs 102, 104 communicates with one or more other components according to at least one of a number of communication protocols, message formats, or standards.

The XI 110 is a self-contained, modularized message exchange platform for driving collaboration and integration among the ICs/ECs 102, 104. The XI 110 includes a central integration repository and directory storing shared collaboration knowledge objects. The XI 110 supports open standards such as various standard markup languages such as XML, WSDL, and SOAP, to provide an abstraction of technical interfaces for the components 102, 104, and for message-based communications across heterogeneous component interfaces. The self-contained, modularized functions of the XI 110 can be provided as one or more Web services based on standard Internet technology, and therefore can be published, discovered and accessed within a network of components 102, 104 using open standards.

Figure 2A:
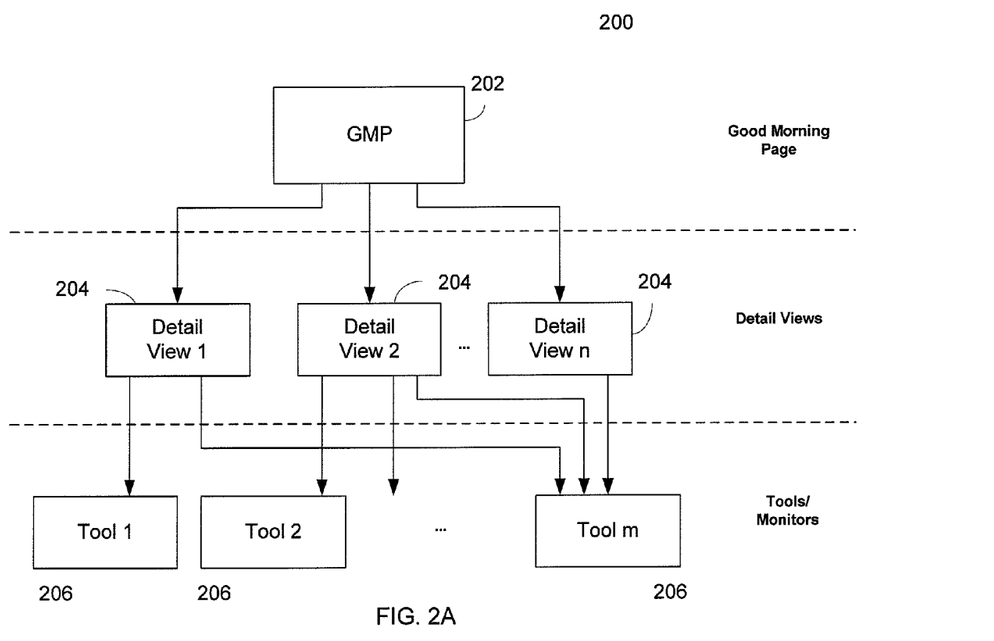
FIG. 2A illustrates a monitoring cockpit.

A monitoring system and method provides a monitoring cockpit 200 (MC), as shown in FIG. 2A. The monitoring cockpit 200 provides a quick and comprehensive overview of an XI domain, and a complete overview about the state and the healthiness of an XI domain is given on a "good morning page" (GMP) 202, an entry page of the monitoring cockpit 200. For completeness and intuitiveness, a drilldown from the GMP to all relevant detail monitors or views 204 and configuration tools 206 is enabled as schematically shown in FIG. 2A.

Figure 2B:
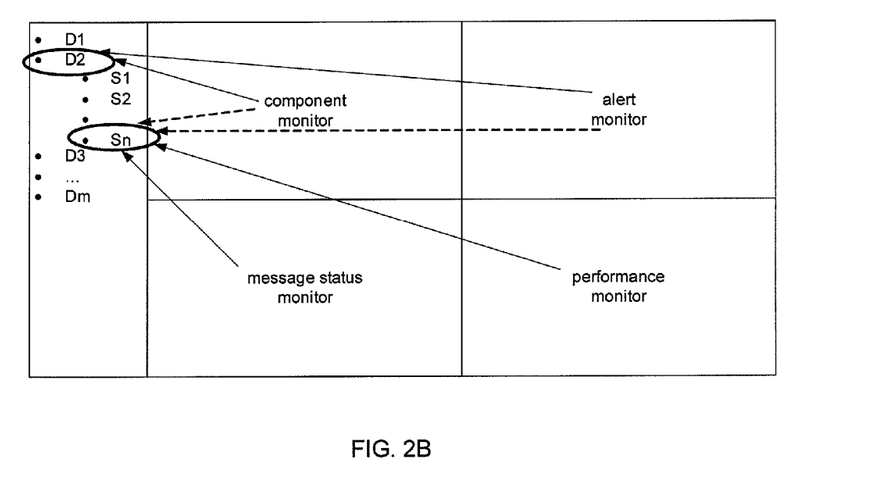
FIG. 2B illustrates a two-level navigation structure of a monitoring cockpit.

As shown in FIG. 2B, the GMP 202 provides an overall two-level navigation structure with the following navigation levels:

XI domain navigation (Dm): the recorded XI domains of the associated system landscape directory ("SLD") are shown and can be used for navigation to an individual XI domain. The SLD is a database or directory where all system components and their installed software components are maintained with their detailed information and relationships amongst each other. Whenever an XI domain is selected, a component monitor and alert monitor are displayed showing the healthiness of the individual XI components and the alerts occurred within the XI domain, respectively.

Messaging scenario navigation (Sn): for a selected XI domain, all message scenarios are shown that are defined for this XI domain by the users of the MC. A messaging scenario essentially denotes a subset of all messages executed by the XI messaging components of this domain. The definition of messaging scenarios will be described in detail below. When a certain messaging scenario is selected a message status monitor and a message performance monitor are displayed showing the states and the performance data of all messages belonging to the messaging scenario in an aggregated way. In one variation, the component monitor and the alert monitor do not refer to an XI domain, but to a selected message scenario.

The navigation structure can be represented as a tree on the left side of the MC and the individual monitors displayed on the main right part of the screen as shown in the FIG. 2B, however, other representations can be generated and displayed. In the example shown in FIG. 2B, there are m XI domains D1, ..., Dm maintained in the associated SLD, where D2 has been selected. Within D2, there are n messaging scenarios S1, ..., Sn, where scenario Sn has been selected. The arrows show to which XI domain/scenario the individual monitors refer. The dotted arrows represent the design variant described above.

Aggregation Views of Scenarios

As said above, a scenario defines a subset of messages within an XI domain. For this subset, certain monitoring visualizations could be defined representing aggregations of the scenario:

Status aggregation: a red, yellow or green traffic light (or other visualization) could be displayed according to an absolute or relative value of erroneous messages within a scenario.

Performance aggregation: a red, yellow or green traffic light (or other visualization) could be displayed according to a minimal, average or maximal value of certain performance data (message execution time, backlog time) of the scenario's messages.

Definition of Sub-Scenarios

A hierarchy of scenarios can be defined with more specific conditions specified for sub-scenarios. Therefore, the subscenarios denote a subset of the messages belonging to a higher level scenario in the hierarchy.

Messaging Scenarios

Messaging scenarios can be defined for a certain XI domain and represent a specific subset of all messages executed by the XI domain. There is one canonical default messaging scenario called Domain where all messages executed by the XI domain belong to. The definition of a specific messaging scenario S is conceptually done by a logical expression in disjunctive normal form as follows:

$$S = C_1 \vee C_2 \vee \ldots \vee C_n$$

where $C_i$ are scenario conditions describing message properties. These conditions refer both to message header attributes and message payload attributes and can therefore be written as follows:

$$(CH_1 \wedge CP_1) \vee (CH_2 \wedge CP_2) \vee \ldots \vee (CH_n \wedge CP_n)$$

where $CH_i$ is a condition on the message header attributes and $CP_i$ on the message payload. Note that conditions on the payload in general require that the message has a certain interface and this will be stated in the message header condition. In contrast, message header conditions are independent from message payload conditions so that some or even all payload conditions can simply be left out (i.e. set to true). The scenario definitions should be definable in a user-specific way so that individual users may define their own scenarios. Furthermore, common scenarios visible for every user should also be definable. For a more intuitive handling of scenario definitions, individual scenario conditions $C_i$ should be storable under a specific name and, thus, can be reusable for several scenario definitions.

Header Conditions

To completely describe a message execution with respect to the relevant header attributes, at least two execution stages of a message must be distinguished: on message arrival and after mapping and routing. On message receipt, the message header attributes mainly refer to the sender system whereas after the mapping/routing steps, the attributes may also refer to the receiver system. (Even on message receipt, some receiver attributes may be set, but this special execution variant will not be taken into account). The following table gives an overview of the attributes referring to a sender and receiver systems, respectively.

| AttrS: attributes referring to sender system | AttrR: attributes referring to receiver system |
|---|---|
| sender qos (SQS) | receiver qos (RQS) |
| sender agency (SA) | receiver agency (RA) |
| sender party type (SPT) | receiver party type (RPT) |
| sender party (SP) | receiver party (RP) |
| sender service (SS) | receiver service (RS) |
| sender interface namespace (SIS) | receiver interface namespace (RIS) |
| sender interface name (SIN) | receiver interface name (RIN) |
| sender adapter type (SAT) | receiver adapter type (RAT) |
| sender channel (SC) | receiver channel (RC) |
| sender agreement (SAG) | receiver agreement (RAG) |

AttrS is denoted as the set of attributes referring to the sender side (SQS, SA, SPT, SP, SS, SIS, SIN, SAT, SC and SAG) and AttrR as the set of attributes referring to the receiver side (RQS, RA, RPT, RP, RS, RIS, RIN, RAT, RC or RAG).

A header condition $CH_i$ can be implemented by a table entry with a column attribute for each of the attributes above. Each attribute of a header condition may contain a discrete value or a "don't care" value, e.g. represented by star symbol '*'. The denotation of a header condition is a conjunction (i.e. Boolean 'and'-operator $\wedge$) of all attributes not having a star value. Therefore, header condition $CH_i=(sqs_i, sa_i, spt_i, \ldots rc_i, rqs_i)$ can be written as:

$$CH_i = (SQS = sqs_i) \wedge (SA = sa_i) \wedge (SPT = spt_i) \wedge \ldots$$
$$\wedge (RC = rc_i) \wedge (RQS = rqs_i)$$

where $sa_i$, $spt_i$, ... denote its attribute values of SQS, SA, ... with the conjuncts of star valued attributes left out from $CH_i$ (i.e. they are set to true). The concept can be extended by allowing regular expressions on single attribute values, but simple equations can be assumed for the conditions in the subsequent sections. For the following discussion, we introduce a more specific notation $[CS_i, CR_i]$ as follows:

$$CH_i = [CS_i, CR_i] \Leftrightarrow CH_i = CS_i \wedge CR_i$$

with $CS_i$ only referring to sender attributes from AttrS and $CR_i$ only referring to sender attributes from AttrR. If no sender or receiver attribute is present, the conditions can be written as $[CS_i,-]$ or $[-,CR_i]$ and we call them pure sender and receiver conditions, respectively. Furthermore, we subsume conditions $[-,CR_i]$ and $[CS_i,CR_i]$ as receiver conditions as they refer to at least one receiver attribute from AttrR.

Evaluation Semantics

Figure 3:
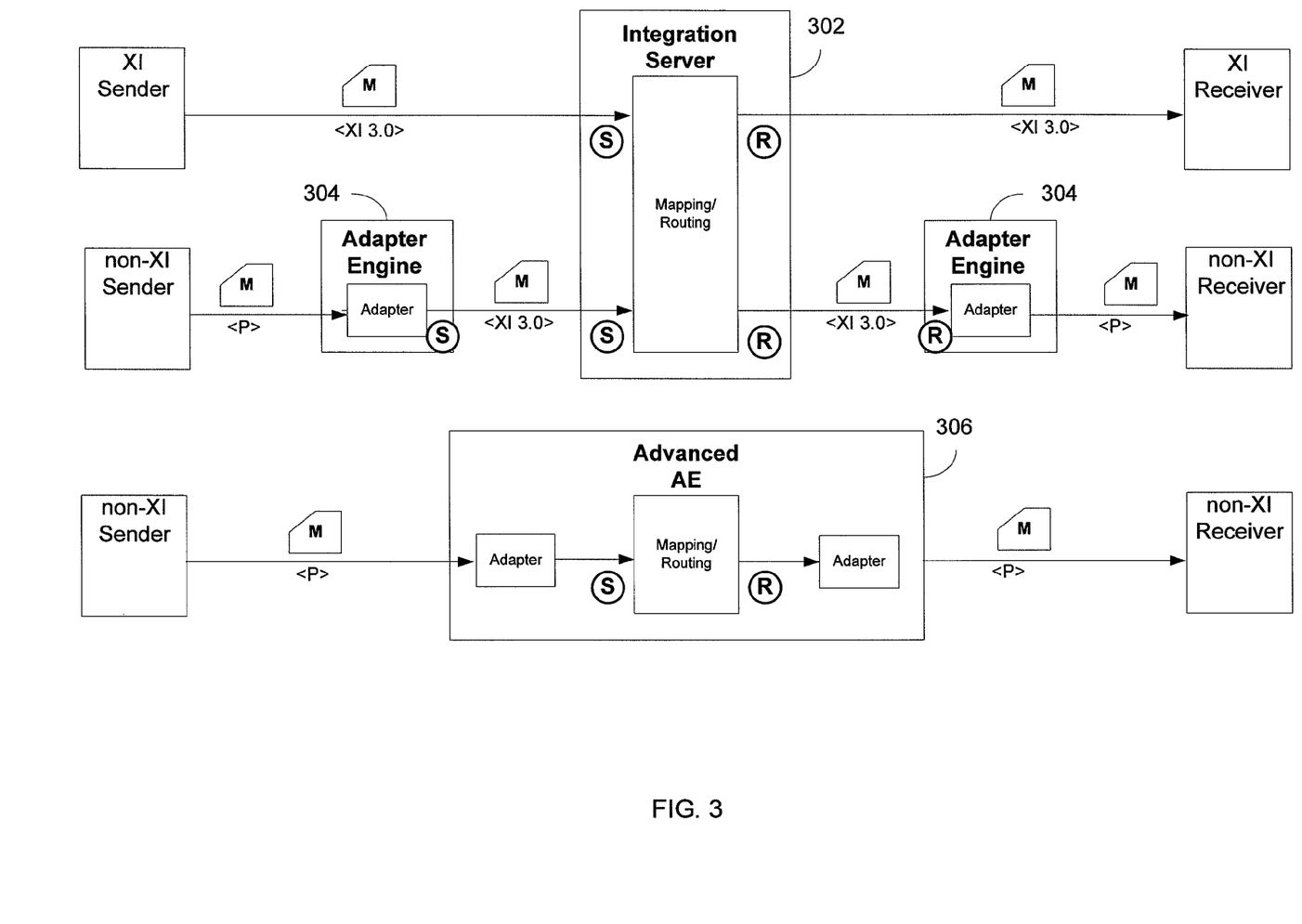
FIG. 3 shows a message exchange architecture.

The canonical places for evaluating sender and receiver header conditions are at message receipt, i.e., before mapping/routing, and after the mapping/routing, respectively, as illustrated in FIG. 3 as there are in general separate asynchronous steps and the messages can be kept in an internal state after message receipt for a certain amount of time. Note that an adapter engine 304 can be involved both on the sender side and additionally in a shortcut scenario without the Integration Server (known as the advanced adapter engine (AAE) 306). This leads to the scenarios shown in FIG. 3, where the (S) and (R) designations mean the evaluation points of the scenario conditions before and after the mapping/routing step.

The adapter engine 304 can only evaluate a sender or receiver condition when a message is already converted to the XI internal format. Remember that sender and receiver conditions are disjunctive conjuncts of a scenario condition as described. The following table summarizes how instead when sender and receiver conditions are evaluated:

| Condition | Evaluation before mapping/routing (S) | Evaluation after mapping/routing (R) |
|---|---|---|
| [CS, —] | CS | CS |
| [—, CR] | false | CR |
| [CS, CR] | false (minimal semantics) <br> CS (maximal semantics) <br> CS $\wedge$ state $\neq$ successful (potential semantics) <br> CS $\wedge$ state = successful (integrated semantics) <br> $\wedge$ "CR is reached" | CS $\wedge$ CR |

Pure sender condition [CS,-] can be evaluated as CS at evaluation point (S) before mapping/routing as CS only contains sender attributes. Note that it can also be evaluated at evaluation point (R) provided that the sender attributes are propagated to (R). Correspondingly, pure receiver condition [-,CR] can be evaluated at (R) as CR. However, it should be set to false at message receipt (S) because it cannot be verified without any sender attribute and, otherwise, setting it to true would imply that the entire scenario condition is true.

Non-pure receiver condition [CS, CR] should at least be evaluated after mapping/routing with the combined condition CS $\wedge$ CR, as only such messages are relevant in this scenario. However, it is not so clear whether and how this condition should be evaluated before the mapping/routing step, especially in an inbound adapter engine with a separate persistency layer. In some implementations, four different semantics can be defined as follows:

According to the minimal semantics, condition [CS, CR] is always evaluated as false. This implies that if this evaluation is also desired before the mapping, a dedicated pure sender condition [CS,-] must be added to the scenario condition.

According to the maximal semantics, condition [CS, CR] is evaluated as CS, i.e. all messages fulfilling sender condition CS are selected at (S) before mapping/routing. This implies that even messages are selected that may not fulfill receiver condition CR after mapping/routing.

According to the potential semantics, sender condition CS is only evaluated for messages in a non-final local state before the mapping/routing step, i.e. the message must be in a backlog or a restartable error state in the corresponding messaging component. Thus, messages that might fulfill CS $\wedge$ CR later are selected.

According to the integrated semantics, only messages that already fulfill CS $\wedge$ CR after the mapping/routing are selected.

A further semantics called "integrated potential semantics" could be defined as the union of the potential and the integrated semantics leading to the following evaluation semantics:

CS $\wedge$ (state$\neq$successful $\vee$ (state=successful and "CR is reached")).

Furthermore the definitions above immediately imply the following containment orders of the semantics:

(minimal semantics) $\subset$ (potential semantics) $\subset$ (integrated potential semantics) $\subset$ (maximal semantics) and (minimal semantics) $\subset$ (integrated semantics) $\subset$ (integrated potential semantics) $\subset$ (maximal semantics)"

If only one messaging component with one persistency layer is involved on the inbound side (i.e. integration server 302 or AAE 306), then the messages are never stored in state successful at (S). This immediately implies that the integrated semantics equals the minimal semantics and the potential semantics equals the maximal semantics then.

For an inbound adapter engine 304 with a separate persistency layer, the integrated semantics is perhaps the most intuitive, but it is quite difficult to implement as it entails a synchronization of the different persistency layers (e.g. integration server 302 and adapter engine 304). The other semantics do not need such a look-forward mechanism and are, therefore, easier to implement.

For each evaluation point (S) and each scenario, the semantics of the message scenario definition should be configurable.

Scenario Implementations

Now that the semantics of a scenario definition have been clarified with respect to header conditions, several implementation variants are discussed. For this purpose, the following requirements should be met: All messages belonging to a messaging scenario should be selectable for display. Furthermore, there should be an aggregated view possible for each scenario with respect to the most important message execution states and the relevant performance data for the MC representation in the message status monitor and the message performance monitor as described above.

To fulfill these requirements, several aspects have to be taken into account:

Data availability: Executed messages are stored in the persistency layer with most of the AttrS and AttrR values transparent. However, some of the sender attributes are not available after routing/mapping anymore neither directly represented or indirectly (so that the data can be concluded from other data), e.g. the sender channel or the sender interface is not present any more in an outbound adapter engine 304. Here, the implementation has to take provisions to make sender attributes AttrS available at evaluation point (R).

Message selection: The selection of the messages belonging to a scenario should be possible. This is also related to the data representation.

Transparency of scenario representation: There may be approaches where a scenario is not directly specified via AttrS and AttrR, but indirectly via other message fields (e.g. from a sender agreement most sender data can be concluded).

Efficiency of scenario aggregation: It should be possible to efficiently provide an aggregated view on a scenario where the messages are represented not individually, but as state groups. It is a design goal to reuse the already existing aggregation infrastructure of the status overview here which internally uses a hash representation and which is described below.

In the following, several approaches are introduced for implementing messaging scenarios, together with a discussion how the requirements are fulfilled. The implementation approaches are distinguished by the internal representation of the scenario definition.

Direct representation

Figure 4:
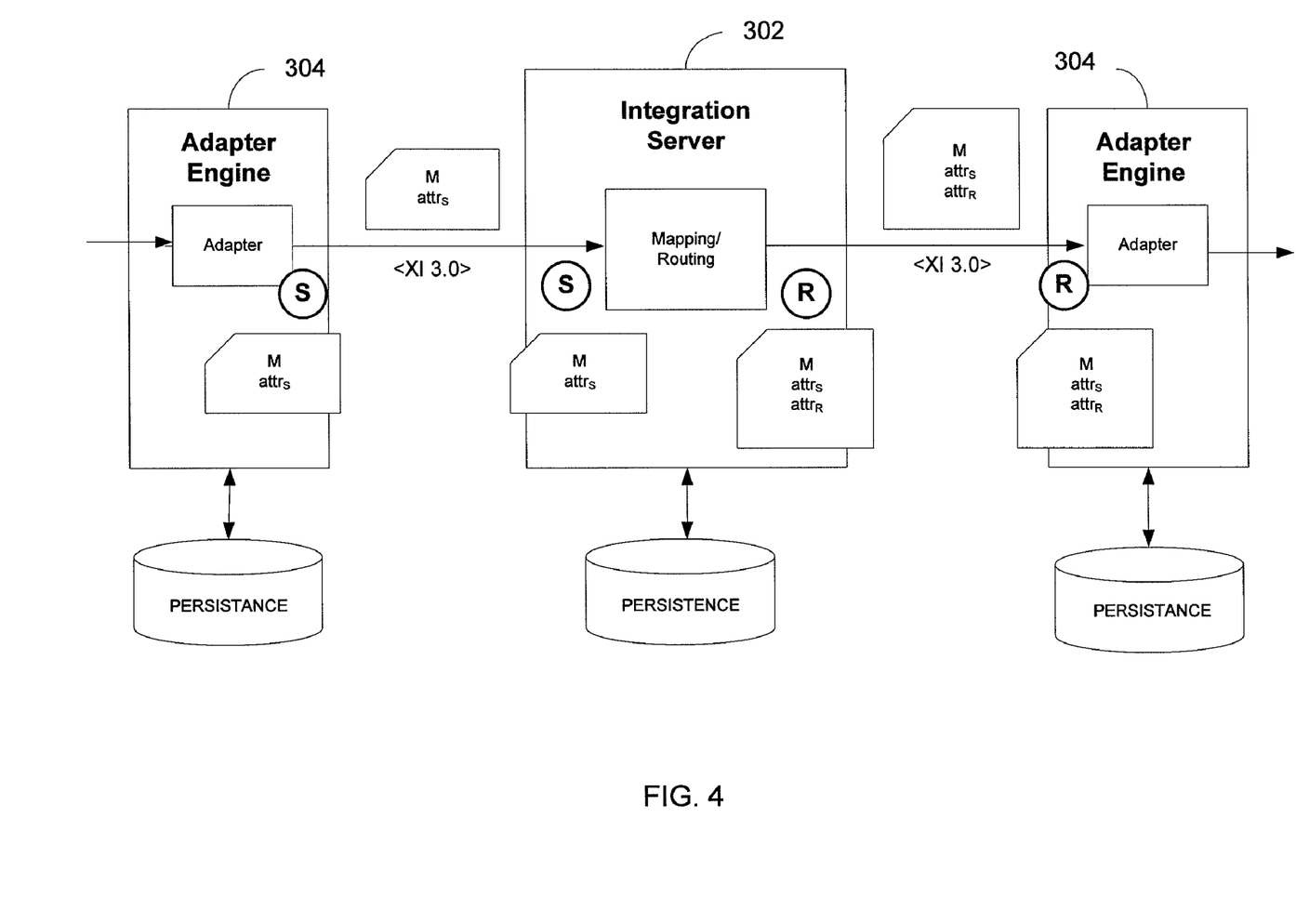
FIG. 4 illustrates another message exchange architecture to exchange messages that are enriched with attributes.

In the direct representation approach, a scenario is represented directly as a set of header conditions without any auxiliary data structures. In this simple approach, the above aspects are tackled as follows:

Data availability: For the data availability problem, all relevant sender and receiver attributes ($Attr_S$ and $Attr_R$) must be transported and stored within all XI messaging components (see FIG. 4).

Message selection: The scenario definition could be directly translated into a database selection. The selection is not very efficient as many database attributes are involved.

Transparency: Clearly, the transparency is preferable, as the scenario definition is taken directly.

Efficiency of scenario aggregation: Aggregation could be done via a direct database selection, however this is very inefficient and the existing aggregation infrastructure is not reused at all. Therefore, aggregation is a great weakness of this approach.

Agreement Representation

Figure 5:
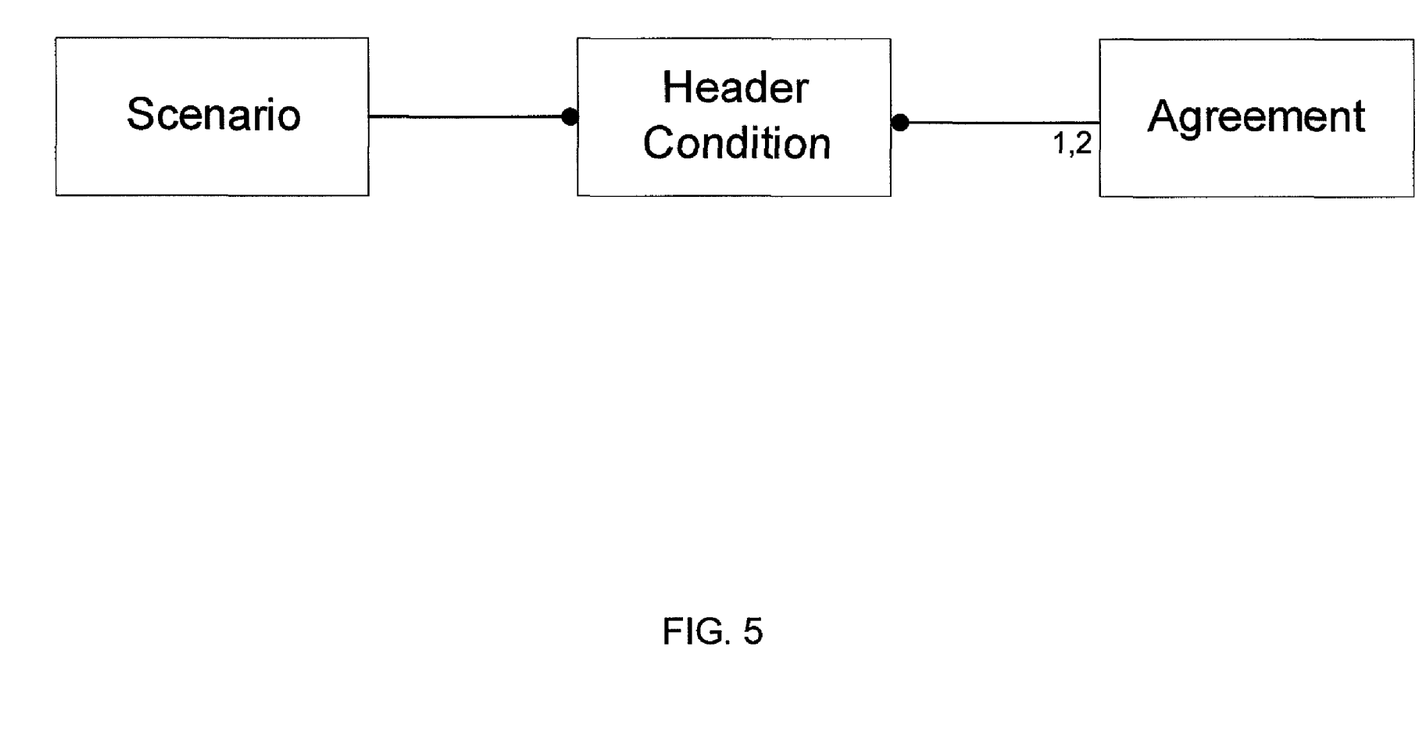
FIG. 5 illustrates a data model for an agreement representation of a message scenario.

This approach is based on the principle that each message is assigned exactly to one sender agreement on message receipt and to one receiver agreement after the mapping/routing step. These agreements represent the sender and receiver attributes AttrS and AttrR completely. Thus, the assigned sender and receiver agreement have to be attached to each message at runtime and both are transported and stored transparently within XI messaging components. Unfortunately, it is not possible to unambiguously calculate for a given general scenario definition the matching sender and receiver agreements. For example, there can be generic sender agreements that apply for all messages from a certain sender system. Depending on the sender interface, two messages from this sender system may or may not be assigned to the same agreement.

Conversely, each sender and receiver agreement can be directly translated into a sender and receiver condition CS and CR, respectively. Therefore, in this approach, the conditions are indirectly formulated via agreements as depicted by the data model shown in FIG. 5. An individual header condition is defined by a sender agreement and/or a receiver agreement. However, this restricts the scenario definition as only certain generic values are allowed for sender and receiver agreements. Furthermore, the scenario definitions are more difficult to understand as a sender or receiver agreement has to be translated into the header condition. Thus, a scenario definition editor is recommended for making the scenario definitions and the existing sender and receiver agreements more transparent.

A further variant is to restrict scenario descriptions to specific agreements or even to so-called All-in-One configuration objects that provide a straightforward 1-to-1 mapping/routing configuration without any generic values.

Figure 6:
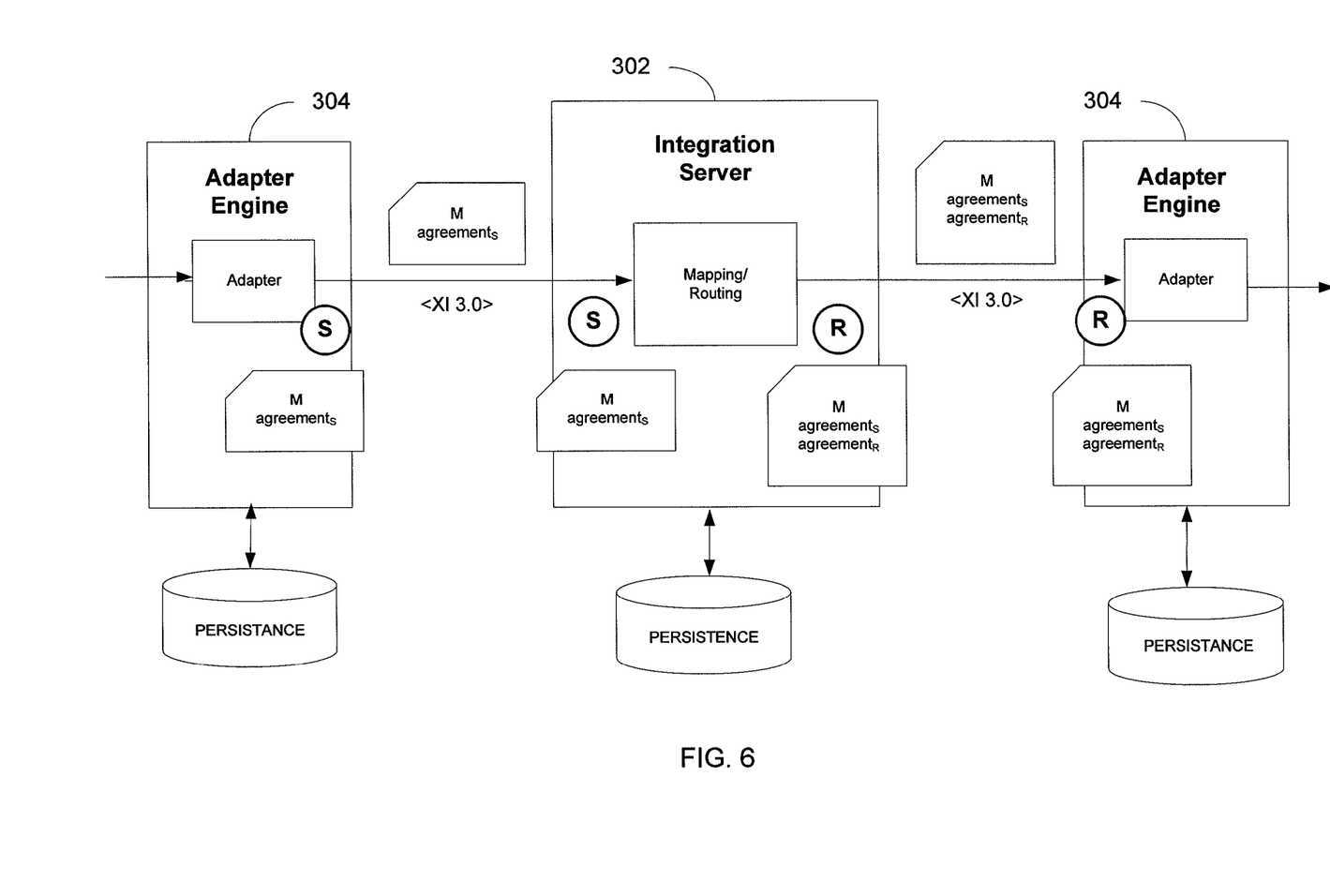
FIG. 6 illustrates a message exchange architecture employing an agreement representation for implementing the messaging scenario.

One difficulty is that sender agreements are not obligatory for some adapter types. This entails that, for messages being captured by a scenario definition, there must be configured sender agreements additionally. In this approach, the above aspects are tackled as follows:

Data availability: For the data availability problem, the sender agreement id and the receiver agreement id (agreementS and agreementR) are transported and stored within XI messaging components (see FIG. 6).

Message selection: The message selection can be efficiently done only via sender and receiver agreement database attributes. It could be implemented very efficiently if both attributes are indexed in the database.

Transparency: Clearly, the transparency is restricted because of the indirection via sender and receiver agreements. A scenario definition editor could help here. On the other hand, the assignment of sender and receiver agreements directly reflects message execution leading to a more direct model with respect to the underlying configuration in the Integration directory.

Efficiency of scenario aggregation: Aggregation could be done via a direct database selection, however this is very inefficient and the existing concurrent aggregation infrastructure is not reused at all. Therefore, aggregation is a great weakness of this approach.

Hash Representation

This approach is based on the existing concurrent aggregation infrastructure of the message status overview functionality. Under the hash representation approach, the messages are aggregated according to the header attributes of the message by building a hash value on the record of header values. The hash values are always built on the complete record of sender and receiver attributes.

Figure 7:
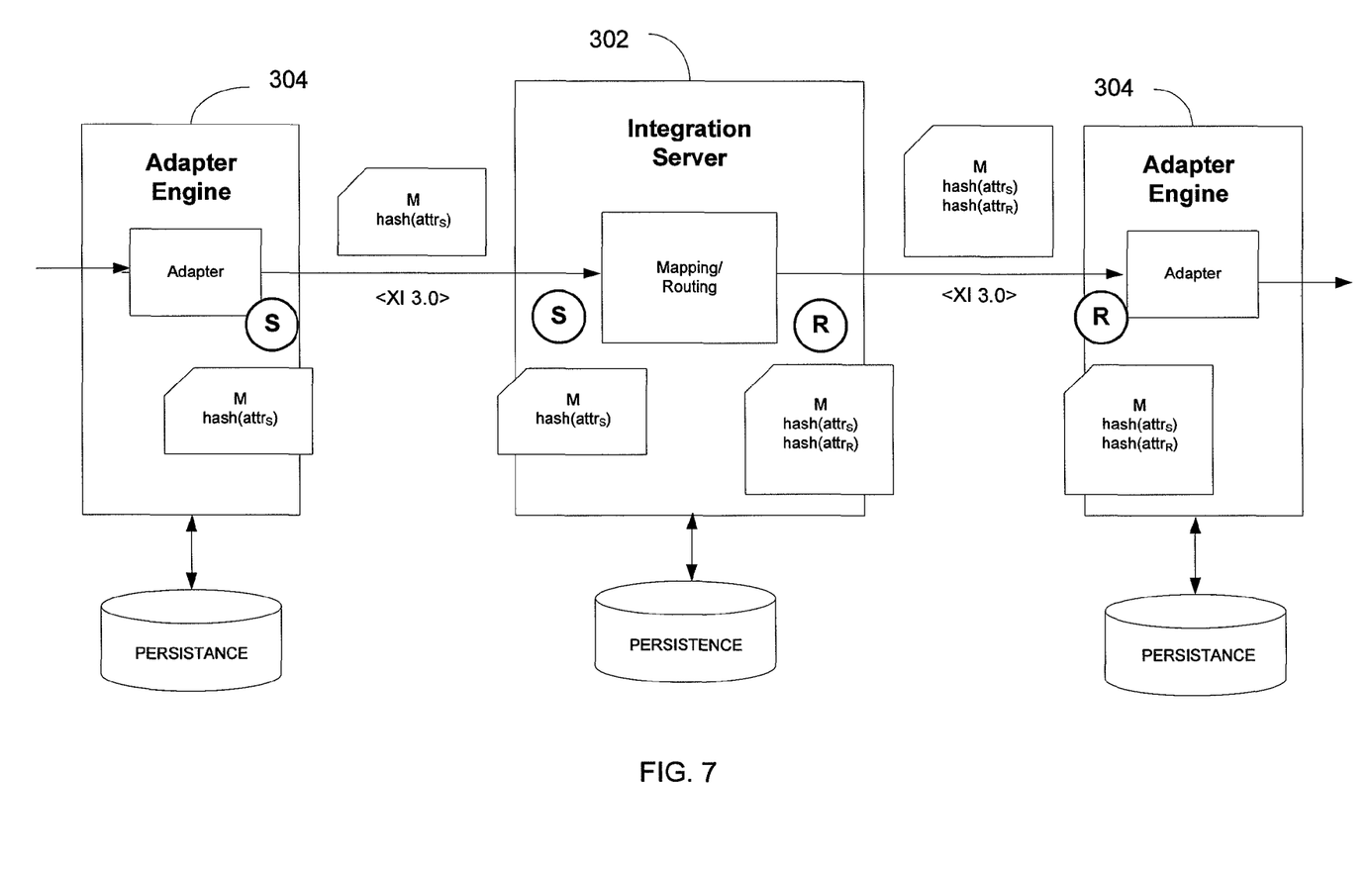
FIG. 7 illustrates a message exchange architecture employing a hash representation for implementing the messaging scenario.

This approach can be modified by defining two hash values, one for the sender attributes and the other for the receiver attributes and both hash values are attached to the messages where the sender hash is calculated on message receipt and the receiver hash is built after the mapping/routing step. Both hash values (hash(attrs) and hash(attrR)) are attached to each message at runtime and both are transported and stored transparently within XI messaging components (see FIG. 7). Note that this pair of hash values conceptually constitutes a single hash value for all header attributes.

The assignment of the hash values to the sender/receiver attribute records is stored in dedicated mapping tables in the messaging components' persistency layer. Whenever a new hash value is calculated, this assignment to the header attributes is inserted in the mapping table. It is assumed that no clash of hash values occurs (otherwise, two hash values of two different hash algorithms can be taken). Thus, the table contains the sender hash and receiver hash values for message header combinations occurred so far in all message executions.

Under these assumptions, for a given set of already occurred hash values, each header condition $CH_i$ can be unambiguously assigned to a finite set of hash values hash $(CH_i)$ stored in the hash table. Altogether, a scenario specification is denoted by the union of all sets of hash values of the individual disjunctive header conditions:

$$hash(CH):=\cup hash(CH_i)$$

With this approach, the selection of messages belonging to a certain scenario CH can easily be done by selecting for all hash values from hash(CH). This is also depicted by the data model in FIG. 8.

Figure 8:
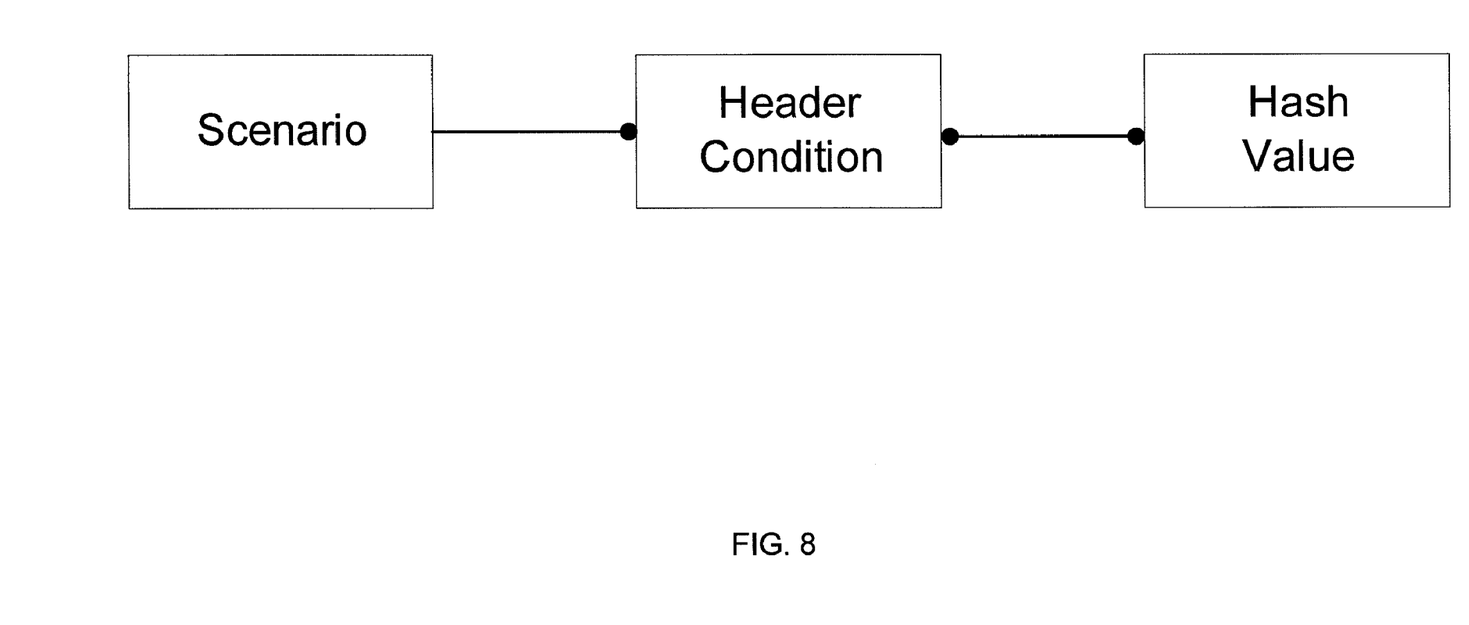
FIG. 8 illustrates a data model for a hash representation of a message scenario.

This assignment can be calculated statically when defining a scenario. However, this approach makes a synchronization of the assignment necessary: Whenever a new hash value occurs it must also be assigned to all fulfilled scenario specifications accordingly. Furthermore, this approach requires a uniform hash function in all XI messaging components, particularly the integration server 302 and adapter engine 304. In this approach, the above aspects are tackled as follows:

Data availability: For solving the data availability problem, the sender hash value and the receiver hash value are transported and stored within XI messaging components.

Message selection: The message selection can be efficiently done only via sender and receiver hash values that are stored as transparent database attributes. It can be implemented very efficiently if both attributes are indexed in the database.

Transparency: This approach is very transparent to the specifier of a scenario as the header conditions can be freely specified without restrictions. When analyzing message flows, the corresponding hash values have to be looked up in the mapping table of the hash values. Here, a dedicated tool would be very helpful.

Efficiency of scenario aggregation: With this approach, the existing concurrent aggregation infrastructure can be reused as it is centrally based on the hash value concept. Therefore, the aggregation infrastructure is integrated.

Agreement Representation with Hash Connection

Figure 9:
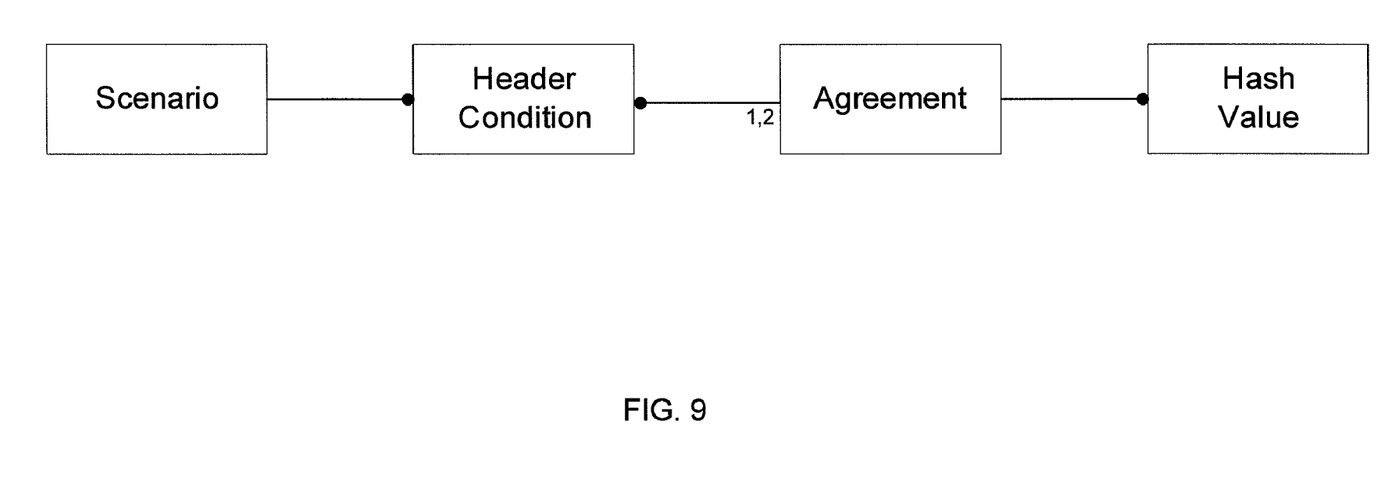
FIG. 9 illustrates another data model for an alternative hash representation of a message scenario.

This approach mainly follows the agreement representation approach described above, but provides an additional connection to the hash representation. The header conditions are defined via sender and/or receiver agreements just as in the ordinary agreements representation approach, but when the hash value is calculated during message execution, an additional link from the hash value to the sender or receiver agreement is made. The resulting data model is illustrated in FIG. 9.

Compared with the data model of the hash representation approach as depicted in FIG. 8, the m:n relationship between header conditions and hash values is conceptually transformed into two 1:n relationships to the agreements. In effect it is a 1:n relationship to the hash values and a (1,2):n relationship to the header conditions. Note that the hash values can not be statically assigned to the agreements because of the reasons explained. This implies that the relationship between the hash values and the agreements may change on updating an agreement with respect to attributes from AttrS or AttrR, but will be adapted automatically by continuously maintaining it during message execution. This approach has the same properties as the agreements approach with respect to data availability, message selection and transparency, but has the substantial advantage that the data aggregation infrastructure can be used as each hash value can be assigned to a scenario.

Payload Conditions

A payload condition $CP_i$ may consist of several parameter conditions $CPP_{i1}$ to $CPP_{ik}$ with a simple conjunctive semantics:

$$CP_i = CPP_{i1} \wedge CPP_{i2} \wedge \ldots \wedge CPP_{ik}$$

Each parameter condition $CPP_{ij}$ is described by the following scalar data that can also be stored in a database table:
  interface type (sender/receiver)
  parameter name
  boolean operand
  parameter value The semantics of a parameter condition $CPP_{ij}$=(it, pn, op, pv) is simply the Boolean value:

pn op pv where pn is a parameter name of the corresponding sender interface ($sis_i$, $sin_i$) or receiver interface ($ris_i$, $rin_i$) respectively, depending on its type. This implies that the corresponding interfaces are given in the associated header condition and do not have a star value. This can be checked or guaranteed by the editor where the scenarios are defined.

As a payload condition either refers to a sender or a receiver interface via a corresponding header condition and, thus, only extends one of the schematic conditions [CS, -], [-,CR] or [CS,CR], the evaluation semantics described above can be applied without modification.

When payload conditions are evaluated, performance considerations have to be made because the extraction of the relevant payload data may be costly, e.g. for a very large payload. Relevant payload data could be extracted during receipt and mapping steps when the payload is read anyway and could be stored separately with the message so that a further scanning of the payload is not necessary any more at the evaluation points (S) and (R).

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

When payload conditions are evaluated, performance considerations have to be made because the extraction of the relevant payload data may be costly, e.g. for a very large payload. Relevant payload data could be extracted during receipt and mapping steps when the payload is read anyway and could be stored separately with the message so that a further scanning of the payload is not necessary any more at the evaluation points (S) and (R).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A computer-implemented method comprising:
defining a scenario definition for a messaging scenario representing a subset of messages being exchanged at runtime via a message exchange infrastructure, the message exchange infrastructure comprising an adapter engine that performs at least one of converting a processed message from a first format of a sender application component to an internal format of the exchange infrastructure and converting the processed message from the internal format of the exchange infrastructure to a second format of a receiver application component, the scenario definition comprising a scenario condition specifying a state of one or more scenario attributes related to at least one of a message header and a message payload;
evaluating the processed message to determine that the processed message is part of the subset of messages represented by the messaging scenario, the evaluating being performed while the processed message is in the internal format, the evaluating comprising determining that the processed message meets at least the scenario condition;
receiving, via a user interface displaying a monitoring cockpit, a selection of the messaging scenario, the monitoring cockpit comprising one or more user interface elements selectable by a user to choose the messaging scenario from a plurality of scenarios defined for the exchange infrastructure; and
displaying, in the monitoring cockpit in response to the receiving, a message status monitor showing an aggregated state of the processed message and all messages belonging to the messaging scenario and a message performance monitor showing aggregated performance data of the processed message and all messages belonging to the messaging scenario.

2. The method of claim 1, further comprising aggregating the processed message and all messages belong to the messaging to determine the aggregated state and the aggregated performance data.

3. The method of claim 2, wherein the aggregating the processed message and all messages belonging to the messaging scenario further comprises aggregating the processed message and all messages belonging to the messaging scenario according to header attribute values using a hash value built from the header attribute values.

4. The method of claim 1, wherein the scenario definition comprises a set of header conditions without auxiliary data structures.

5. The method of claim 1, wherein the scenario condition comprises an assignment of the processed message to a single specific sender agreement upon receipt of the message at the exchange infrastructure after conversion of the processed message to the internal format.

6. The method of claim 1, wherein the scenario condition comprises an assignment of the processed message to a single specific receiver agreement after the processed message has been mapped and routed to the single specific receiver.

7. The method of claim 1, wherein the scenario attributes related to the payload condition comprise one or more parameters defined for a content of the processed message.

8. The method of claim 1, wherein the internal format differs from and is incompatible with at least one of the first format and the second format.

9. A computer program product, comprising a machine-readable storage medium storing instruction code that, when executed by a computer system, cause the computer system to perform operations comprising:
defining a scenario definition for a messaging scenario representing a subset of messages being exchanged at runtime via a message exchange infrastructure, the message exchange infrastructure comprising an adapter engine that performs at least one of converting a processed message from a first format of a sender application component to an internal format of the exchange infrastructure and converting the processed message from the internal format of the exchange infrastructure to a second format of a receiver application component, the scenario definition comprising a scenario condition specifying a state of one or more scenario attributes related to at least one of a message header and a message payload;
evaluating the processed message to determine that the processed message is part of the subset of messages represented by the messaging scenario, the evaluating being performed while the processed message is in the internal format, the evaluating comprising determining that the processed message meets at least the scenario condition;
receiving, via a user interface displaying a monitoring cockpit, a selection of the messaging scenario, the monitoring cockpit comprising one or more user interface elements selectable by a user to choose the messaging scenario from a plurality of scenarios defined for the exchange infrastructure; and
displaying, in the monitoring cockpit in response to the receiving, a message status monitor showing an aggregated state of the processed message and all messages belonging to the messaging scenario and a message performance monitor showing aggregated performance data of the processed message and all messages belonging to the messaging scenario.

10. The computer program product of claim 9, wherein the operations further comprise: aggregating the processed message and all messages belonging to the messaging to determine the aggregated state and the aggregated performance data.

11. The computer program product of claim 10, wherein the aggregating the processed message and all messages belonging to the messaging scenario further comprises aggregating the processed message and all messages belonging to the messaging scenario according to header attribute values using a hash value built from the header attribute values.

12. The computer program product of claim 9, wherein the scenario definition comprises a set of header conditions without auxiliary data structures.

13. The computer program product of claim 9, wherein the scenario condition comprises an assignment of the processed message to a single specific sender agreement upon receipt of the message at the exchange infrastructure after conversion of the processed message to the internal format.

14. The computer program product of claim 9, wherein the scenario condition comprises an assignment of the processed message to a single specific receiver agreement after the processed message has been mapped and routed to the single specific receiver.

15. The computer program product of claim 9, wherein the scenario attributes related to the payload condition comprise one or more parameters defined for a content of the processed message.

16. A system comprising:
   at least one processor; and
   at least one machine readable storage medium storing instructions that, when executed by the at least one processor, cause the at least one processor to perform operations comprising:
   defining a scenario definition for a messaging scenario representing a subset of messages being exchanged at runtime via a message exchange infrastructure, the message exchange infrastructure comprising an adapter engine that performs at least one of converting a processed message from a first format of a sender application component to an internal format of the exchange infrastructure and converting the processed message from the internal format of the exchange infrastructure to a second format of a receiver application component, the scenario definition comprising a scenario condition specifying a state of one or more scenario attributes related to at least one of a message header and a message payload;
   evaluating the processed message to determine that the processed message is part of the subset of messages represented by the messaging scenario, the evaluating being performed while the processed message is in the internal format, the evaluating comprising determining that the processed message meets at least the scenario condition;
   receiving, via a user interface displaying a monitoring cockpit, a selection of the messaging scenario, the monitoring cockpit comprising one or more user interface elements selectable by a user to choose the messaging scenario from a plurality of scenarios defined for the exchange infrastructure; and
   displaying, in the monitoring cockpit in response to the receiving, a message status monitor showing an aggregated state of the processed message and all messages belonging to the messaging scenario and a message performance monitor showing aggregated performance data of the processed message and all messages belonging to the messaging scenario.

17. The system of claim 16, further comprising aggregating the processed message and all messages belonging to the messaging scenario to determine the aggregated state and the aggregated performance data.

18. The system of claim 16, wherein the scenario definition comprises a set of header conditions without auxiliary data structures.

19. The system of claim 16, wherein the scenario condition comprises an assignment of the processed message to a single specific sender agreement upon receipt of the message at the exchange infrastructure after conversion of the processed message to the internal format.

20. The system of claim 16, wherein the scenario condition comprises an assignment of the processed message to a single specific receiver agreement after the processed message has been mapped and routed to the single specific receiver.

* * * * *